United States Patent Office 3,039,987
Patented June 19, 1962

3,039,987
PULVERULENT COATING COMPOSITIONS ADAPTED FOR USE IN FLUIDIZING PROCESSES CONTAINING EPOXY RESIN AND FILLERS
Irving N. Elbling, Pittsburgh, Pa., assignor to Westinghouse Electric Corporation, East Pittsburgh, Pa., a corporation of Pennsylvania
No Drawing. Filed May 28, 1959, Ser. No. 816,380
10 Claims. (Cl. 260—37)

The present invention relates to coating compositions and has particular reference to homogeneous pulverulent coating compositions adapted for use in fluidized bed coating processes.

The fluidized bed process of coating articles provides coatings which are substantially thicker than can be obtained by conventional brush, spray or roller coating with paints. Thus, utilizing the fluidized bed coating method relatively thick coatings of from 0.005 to 0.062 inch may be applied in one application. On the other hand, with conventional painting methods, such as spraying, brushing or dipping, and the like coatings of a thickness of only 0.001 inch to 0.003 inch are the maximum attainable.

The fluidized bed method of coating articles essentially is a dipping process wherein the article to be coated is dipped or otherwise introduced into a fluidized mass of solid resin particles. The resin particles are set in fluid motion by an upward flow of a gas such as air. When fluidized, the mass of resin particles has the appearance of a boiling liquid and assumes penetrating flow characteristics similar to a liquid. The article to be coated is preheated to a temperature above the melting point of the resin and then immersed into the fluidized mass of resin powder particles. When the resin particles contact the preheated article, the particles melt and adhere to the preheated article surface. If the resin powder is a thermoplastic resin, it will fuse to the article and a smooth coating will result. Thermosetting resin powders must be cured or afterbaked subsequent to removal of the article from the fluidized mass of resin powder. The afterbake period varies depending on the particular thermosetting characteristics of the resin employed and the article being coated.

Certain pulverulent coating compositions intended for use in the fluidized bed coating method have been suggested heretofore. For various reasons, none of these resin coating compositions has been completely satisfactory. There has been a need for a pulverulent resin composition which, when employed in the fluidized bed process, provides a uniform coating on corners and sharp edges of articles of a thickness sufficient to provide adequate electrical insulating properties, satisfactory corrosion protection and weathering resistance, and the like. There also has been a need for a resin coating composition which would not run off excessively during diffusing, and/or afterbaking or curing in the case of thermosetting materials.

It now has been discovered that coating compositions having these desirable characteristics are obtainable and can be produced by incorporating therewith critical amounts of certain specified finely divided filler materials.

Broadly, in accordance with the present invention, there is provided a homogeneous pulverulent coating composition comprising a major proportion of relatively coarse solid particles having an average particle size of from 40 to 500 microns, each of said particles comprising an intimate mixture of epoxy resin and a curing agent therefor, and a minor proportion of fine solid particles having an average particle size of from 0.01 to 5 microns.

It has been discovered that the incorporation of a minor proportion of such fine solid particles into a coating composition comprising an intimate mixture of epoxy resin and a curing agent therefor provides a coating composition in which flow or run-off are eliminated or substantially minimized and that satisfactory fluidization coupled with thick deposition of coating on corners and sharp edges is achieved. The incorporation of as low as 0.05% by weight of fine solid filler provides the desired smooth fluidization of the coating powder and excellent deposits of coating herein described.

The thermosetting resin used in formulating the coating composition of the present invention is an epoxy resin otherwise known as a resinous glycidyl polyether. Such resins may be prepared by reacting predetermined amounts of at least one polyhydric phenol and at least one epihalohydrin in an alkaline medium.

Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such, for example, as 4,4'-dihydroxy-diphenyl-dimethyl-methane (referred to hereinafter as bis-phenol "A") and 4,4'-dihydroxy-diphenyl-methane. In admixture with the named polynuclear phenols, use also may be made of those polynuclear phenols wherein the phenol nuclei are joined by sulfur bridges, such, for example, as 4,4'-dihydroxy-diphenyl-sulfone.

While it is preferred to use epichlorohydrin as the epihalohydrin in the preparation of the resinous polymeric epoxide material of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides such as potassium hydroxide and lithium hydroxide may be employed although it is preferred to use sodium hydroxide since it is relatively inexpensive.

The resinous polymeric epoxide or glycidyl polyether of a dihydric phenol suitable for use in this invention has a 1,2-epoxy equivalency greater than 1.0. By epoxy equivalency reference is made to the average number of 1,2-epoxy groups

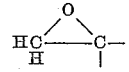

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it has a value greater than 1.0. The 1,2-epoxy equivalency of the polyether is thus a value between 1.0 and 2.0.

Resinous polymeric epoxides or glycidyl polyethers suitable for use in accordance with this invention may be prepared by admixing and reacting from 1 to 2 mol proportions of epihalohydrin, preferably epichlorohydrin, with about 1 mol per portion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of alkali salts thereof. If desired, the aqueous alkali and bis-phenol "A" may be admixed first and then the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to 3 hours or more, depending upon the quantities of reactants used.

Upon completion of heating, the reaction mixture separates into layers. The upper aqueous layer is withdrawn and discarded and the lower layer is washed with hot water to remove unreacted alkali and halogen salts, in this case sodium chloride. If desired, dilute acids, for example, acetic acid or hydrochloric acid may be employed during the washing procedure to neutralize the excess alkali.

Glycidyl polyethers may be prepared in either solid or liquid form. The commercially available glycidyl polyethers which are solids are less expensive than the liquid grades, thus the use of the solid material affords a substantial cost savings when used in accordance with the present invention. The epoxy resin may, however, be used in this invention in either the solid or liquid form.

The following example illustrates the preparation of a glycidyl polyether suitable for use in accordance with this invention.

EXAMPLE I

Into a suitable reaction vessel there was introduced two liters of water, 160 parts of sodium hydroxide and 685 parts of bis-phenol "A." This mixture was agitated for several minutes at a temperature of about 50° C. Thereafter, a mixture of approximately 280 parts of epichlorohydrin and 85 parts of xylol was added to the reaction mixture. This formulation contains a ratio of 1 mol of epichlorohydrin to 1 mol of bis-phenol "A," with about 15% of sodium hydroxide and about 10% of salt. The reaction mixture was maintained at a temperature of about 95° C. to 100° C. for a period of about 2 hours. The resin so produced was washed free of alkali and salt by successive washings with hot water at 100° C. After four separate washings, the solution was neutralized with sulfuric acid and washed once with water.

As much water as possible was removed from the kettle by decantation and the resin was dried by heating to 150° C. The hot resin was then poured into a pan and permitted to cool to a solid.

Any one of several different catalysts or curing agents may be used in accordance with this invention for effecting the cross linking or thermosetting of the epoxy resin. Suitable solid catalysts which may be used include, for example, metaphenylene diamine; dicyandiamide; boron trifluoride-monoethylamine complex; triethanolamine borate; methyl dianiline; pyromellitic dianhydride; hexachloroendomethylenetetrahydrophthalic anhydride; diamino diphenyl sulfone; phthalic anhydride; hexahydrophthalic anhydride; maleic anhydride; aminealdehyde condensation products, such as urea-formaldehyde, melamine-formaldehyde, etc.; phenol-aldehyde condensation products such as formaldehyde, acetaldehyde, paraformaldehyde butyraldehyde and the like reacted with phenol, cresol, cresylic acid, etc. These solid catalytic materials may be used singly or in combinations of any two or more.

Suitable liquid catalytic materials which may be used in accordance with the present invention include, for example, methylnadic anhydride, as well as the catalysts disclosed in copending applications Serial Nos. 749,287, now U.S. Patent No. 2,941,981 and 774,592, now U.S. Patent No. 2,953,545 and U.S. 2,809,184. These liquid catalysts also may be used singly or in combinations of two or more. Moreover, mixtures of one or more solid and liquid catalytic materials are suitable for use in accordance with the present invention.

In preparing the coating composition of the present invention, it is preferred to form initially a melt of the resin and catalyst. Specifically, the resin is introduced onto a two-roll hot roll mill maintained at a temperature of between about 125 and 150° C. A two-roll mill is not necessary to the process. Thus, any device or means of heating and mixing the ingredients in the molten state may be used.

After the resin is molten, any pigments or fillers desired are introduced into the resin, and milling between the rolls is continued until a smooth uniform liquid dispersion is achieved. The catalyst, in either liquid or solid form, then is added to the molten mixture of resin and mixing is continued until the catalyst has been completely dispersed therein. Generally, this may be accomplished in at most 2 minutes. The catalyst may be employed in amounts within the range of about 2 to 90%, by weight, based on the total weight of the resin plus the catalyst.

After the resin-catalyst melt has been uniformly milled, it is removed from the hot rolls and cooled. The resultant lumps of resin-catalyst mixture then are broken up and ground in a suitable grinding device such as a hammer mill, Wiley mill, or other suitable grinding device to form a mass of powders having a size within the range of from 40 to 500 microns. Each particle contains from 98 to 10% resin and 2 to 90% catalyst.

About 0.05 to 20% by weight of a finely divided solid filler comprising at least one metal oxide then is added to the dried powdered resin-catalyst mixture and dry blended therewith. The filler has an average particle size of from 0.01 to 5 microns.

Examples of suitable filler materials include at least one oxide of at least one metal selected from the group consisting of silicon, sodium, aluminum, calcium, magnesium, iron, titanium, antimony, and zinc.

The above fillers may be used singly or in combinations of one or more. The following are examples of fillers compositions which are available commercially. These compositions, when ground to the proper particle size, namely, 0.01 to 5 microns, are suitable for use in accordance with the present invention.

*Filler A*

| | Percent |
|---|---|
| $SiO_2$ | 90 |
| $Na_2SO_3$ | 2–3 |
| $Al_2O_3+Fe_2O_3$ | 1.0 |
| Volatiles | Balance |

*Filler B*

| | |
|---|---|
| $SiO_2$ | 88 |
| $Na_2SO_4$ | 0.04 |
| Volatiles | Balance |

*Filler C*

| | |
|---|---|
| $SiO_2$ | 64 |
| $NaCl$ | 1.5 |
| $CaO$ | 18 |
| $Al_2O_3$ | 0.6 |
| $MgO$ | 0.1 |
| $Fe_2O_3$ | 0.15 |
| Volatiles | Balance |

*Filler D*

| | |
|---|---|
| $SiO_2$ (moisture-free basis) | 99 |
| $Fe_2O_3$ | 0.004 |
| Volatiles | Balance |

The composition thus prepared then is particularly adapted for use in the fluidized resin bed coating process. This process comprises introducing a given quantity of the resin coating powder composition into a fluidizing tank. Generally, such a tank comprises a metal container having a circular side wall and a flat bottom wall. A porcelain plate, having a plurality of holes or passageways therein, is mounted in the tank near the flat bottom wall. A gas inlet is mounted in the tank wall to allow gas to enter the tank into a chamber between the porcelain plate and the flat bottom wall of the container.

The injection of gas through the holes in the porcelain plate into the powdered resin causes the resin to be suspended within the tank so as to appear to increase in volume and assume the characteristics of a fluid.

Articles to be coated are cleaned and then heated to a temperature above the melting point of the particular resin coating being employed. Generally, this will be a temperature within the range of about 80° C. to 300° C. The exact temperature at which the article is heated is dependent not only upon the melting point of the particular resin coating composition being employed but also upon the desired coating thickness and the thermal content of the article being coated.

The heated article is immersed into the fluidized powdered resin mass for a period generally of about two to fifteen seconds. Particles contacting the heated article melt and adhere thereto. During immersion and immediately upon withdrawal of the article from the mass, the melted resin will flow out over the article and will solidify into a smooth uniform coating as the article cools. The article may be reheated and redipped several times to build up a coating of the desired thickness. After the desired coating thickness has been deposited on the article, the article then is post-baked at temperatures varying from 100° to 300° C. for from about 15 minutes to about 6 hours. The coating deposited is smooth and uniform and does not run off during the afterbake period. Moreover, corners and sharp edges on the article are smoothly and uniformly coated thereby providing excellent electrical insulating properties, good weather resistance, and the like.

The following specific examples are set forth to illustrate even more fully the capabilities and advantages of the present invention. The parts given are by weight unless otherwise indicated.

EXAMPLE I

The following powders were dry mixed in a conical twin shell dry blender and placed in a laboratory fluidizer:

| | Grams |
|---|---|
| Epoxy resin (Epon 1001) | 1,000 |
| Dicyandiamide | 70 |
| Venetian red pigment | 10 |

It was impossible to obtain satisfactory coatings when fluidizing this mixture. The powder packed badly and did not coat uniformly.

EXAMPLE II

5% by weight of a commercially available filler composition, identified above as Filler A, was admixed with 95% by weight of the composition prepared in Example I above. With this mixture excellent fluidization was obtained and satisfactory coatings were obtained. Similar satisfactory compositions were obtained by mixing the composition of Example I with 10% by weight of each of the fillers identified above as B, C and D.

EXAMPLE III 100 parts of a solid epoxy resin (Epon 1004), 40 parts of talc and 3 parts of Venetian red pigment were melted and mixed in a molten condition on a two-roll hot roll mill. The temperature of the hot rolls was maintained between 125° and 150° C. After the three ingredients were well dispersed, 7 parts of dicyandiamid were added and hot rolled with the mixture for about 1½ minutes. The resultant melt then was removed from the rolls, cooled, broken up, and ground in a hammer mill to provide a mass of particles of which about 35–40% had an average particle size of about 40 microns, 10–15% a size of from about 75–125 microns, and about 50% had a size of about 500 microns.

Fillers A, B, C and D, varying in amounts of from 0.05% to 20% were admixed with the composition described in Example III. Excellent fluidization and smooth uniform coatings were obtained even on sharp corners and edges of articles so coated. The composition did not flow or run off the articles being coated during the post-curing period.

It will be understood that other fillers, extenders, pigments and the like may be incorporated in the compositions of this invention. Such materials are incorporated into the particles comprising the resin and curing agent or catalyst, in amounts of from about 0.5% to 70% by weight based on the total weight of these materials plus resin plus catalyst or curing agent. Examples of such materials are Venetian red, iron oxide, mica, calcium silicate, talc, aluminum silicate, calcium carbonate, clay, flint, beryl ($Be_2O_3$), diatomaceous earth, alumina, and the like.

The resin compositions of this invention may be used to coat articles of various kinds. For example, electrical apparatus such as transformers, stator cores, meter coils, conducting leads, bus bars, generators, motors, circuit breakers, and the like as well as appliances and parts thereof such as air conditioners, fans, dishwashers and racks, and the like as well as tools, handles, and hardware in general.

While the present invention has been described with respect to what at present are considered to be preferred embodiments thereof, it will be understood of course that certain changes, substitutions, modifications and the like may be made therein without departing from its true scope.

I claim as my invention:

1. A homogeneous pulverulent coating composition comprising a major proportion of coarse solid particles having an average particle size of from 40 to 500 microns, each of said particles comprising an intimate mixture of a reactive glycidyl polyether of a polyhydric phenol and an epihalohydrin and a curing agent therefor, and a minor proportion comprising at least 0.05% by weight of the composition of fine solid particles having an average particle size of from 0.01 to 5 microns, said fine solid particles comprising at least one oxide of at least one metal selected from the group consisting of silicon, sodium, aluminum, calcium, magnesium, iron, titanium, antimony, and zinc.

2. A homogeneous pulverulent coating composition as set forth in claim 1 wherein the glycidyl polyether is the product obtained by reacting 2,2-bis (4-hydroxy phenyl) propane and epichlorohydrin in an alkaline medium.

3. A homogeneous pulverulent coating composition as set forth in claim 1 including from 0.5% to 70% by weight, based upon the total weight of the coating composition, of fillers, extenders, and pigments.

4. A homogeneous pulverulent coating composition comprising (A) from 99.95% to 80% by weight of coarse solid particles having an average particle size of from 40 to 500 microns, each of said particles comprising an intimate mixture of a reactive glycidyl polyether of a polyhydric phenol and an epihalohydrin and a curing agent therefor, and (B) from 0.05% to 20% by weight of fine solid particles having an average particle size of from 0.01 to 5 microns, said fine solid particles comprising at least one oxide of at least one metal selected from the group consisting of silicon, sodium, aluminum, calcium, magnesium, iron, titanium, antimony, and zinc.

5. A homogeneous pulverulent coating composition as set forth in claim 4 wherein the glycidyl polyether is the product obtained by reacting 2-2-bis (4-hydroxy phenyl) propane and epichlorohydrin in an alkaline medium.

6. A homogeneous pulverulent coating composition as set forth in claim 4 including from 0.5% to 70% by weight, based upon the total weight of the coating composition, of fillers, extenders, and pigments.

7. A homogeneous pulverulent coating composition comprising (A) from 99.95% to 80% by weight of coarse solid particles having an average particle size of from 40 to 500 microns, each of said particles comprising an intimate mixture of a reactive glycidyl polyether of a polyhydric phenol and an epihalohydrin and a curing agent therefor, and (B) from 0.05% to 20% by weight of fine solid particles having an average particle size of from 0.01 to 5 microns, said coarse particles (A) comprising from 98% to 10% by weight, based upon the total weight of particles (A), of said resinous glycidyl polyether and from 2% to 90% by weight, based upon the total weight of particles (A), of said curing agent and said fine particles (B) comprising at least one oxide of at least one metal selected from the group consisting of silicon, sodium, aluminum, calcium, magnesium, iron, titanium, antimony, and zinc.

8. A homogeneous pulverulent coating composition as set forth in claim 7 wherein the glycidyl polyether is the product obtained by reacting 2,2-bis (4-hydroxy phenyl) propane and epichlorohydrin in an alkaline medium.

9. A homogeneous pulverulent coating composition as set forth in claim 7 including from 0.5% to 70% by weight, based upon the total weight of the coating composition, of fillers, extenders, and pigments.

10. A homogeneous pulverulent coating composition comprising (a) from 99.95% to 80% by weight of relatively coarse solid particles having an average particle size of from 40 to 500 microns, each of said particles comprising an intimate admixture of a reactive glycidyl polyether of a polyhydric phenol and an epihalohydrin and a curing agent therefor, and (b) from 0.05% to 20% by weight of fine solid particles of silicon dioxide having an average particle size of from 0.01 to 5 microns.

References Cited in the file of this patent

UNITED STATES PATENTS

| 2,779,668 | Daniels et al. | Jan. 29, 1957 |
| 2,801,229 | De Hoff et al. | July 30, 1957 |

FOREIGN PATENTS

| 220,363 | Australia | Feb. 18, 1959 |